Patented Apr. 19, 1949

2,467,371

UNITED STATES PATENT OFFICE 2,467,371

BIGUANIDE DERIVATIVES

Francis Henry Swinden Curd and Francis Leslie Rose, Blackley, Manchester, England, assignors to Imperial Chemical Industries Limited, a corporation of Great Britain No Drawing. Application May 25, 1945, Serial No. 595,892. In Great Britain May 10, 1944

Section 1, Public Law 690, August 8, 1946
Patent expires May 10, 1964

6 Claims. (Cl. 260—565)

This invention relates to the manufacture of new biguanide derivatives and more particularly to the manufacture of biguanides bearing either two, three or four substituents upon the terminal nitrogen atoms. The said new compounds are useful as chemotherapeutic agents or as intermediates for chemotherapeutic agents; many of them are valuable antimalarial agents.

According to the invention we make new compounds of the formula—

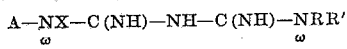

wherein A represents an aryl group, X represents hydrogen or an alkyl group, R represents an aliphatic hydrocarbon radical, R' represents hydrogen or an aliphatic hydrocarbon radical and also R and R' may be joined together to form a divalent aliphatic hydrocarbon chain, and further any or all of the groups A, R and R' may bear one or more non-acidic substituents, by a process comprising bringing into reaction an aryl-dicyandiamide of the formula

with an amine of the formula NHRR', the symbols A, X, R and R' in these formulae having the same meanings as before.

The reaction is conveniently brought about by heating the reagents together, if desired in presence of a solvent or diluent which for convenience may be an excess of the amine when this is liquid under the reaction conditions employed.

The amine may be used either in the form of the free base, or in the form of a salt. Further the reaction may be advantageously carried out in the presence of a metal such as zinc or copper which may be used as such or in the form of an oxide, hydroxide or salt or a pre-formed addition compound with the amine. There may be used, for instance, copper powder, hydrated copper oxide, copper sulphate or zinc chloride. We find that in such cases, the presence of the metal increases the speed of the reaction and improves the yield of the biguanide. Also the biguanide can frequently be conveniently isolated directly from the reaction mixture in the form of a sparingly soluble complex with the metal salt.

The aryl dicyandiamides used as starting materials are a known class of compounds. They have been described by Walther and Grieshammer, Journal für praktische Chemie (2), vol. 92, pp. 209-255. They are more conveniently obtained by the method described in copending application of W. Broadbent and F. L. Rose, Serial No. 595,891, which issued October 22, 1946, as Patent No. 2,409,832.

The di-, tri- or tetra-substituted biguanides made according to this invention are strong bases; they form stable salts with organic and inorganic acids, which in many cases are freely soluble in water. The salts can be made by dissolving the biguanides in aqueous solutions of the acid and then evaporating off the water, but they are more conveniently obtained in a dry form by mixing the components together in an organic solvent such as acetone, or an alcohol in which the salts are sparingly soluble. In this manner there may be readily formed, for example, the salts with acetic acid, lactic acid, methane sulphonic acid, methylene-disalicylic acid, methylene-bis-β-hydroxynaphthoic acid, and hydrochloric acid.

The following examples illustrate, but do not limit, the invention. The parts are by weight.

Example 1

19.5 parts of p-chlorophenyl dicyandiamide, 20 parts of diethylamine, 140 parts of ethyl alcohol, and a solution of 12.5 parts of copper sulphate pentahydrate in 60 parts of water, are mixed and the mixture is stirred and heated under reflux for 2 hours. The resultant suspension is cooled, diluted with 300 parts of water and filtered. The light-brown solid residue which is mainly the copper complex of Nα-p-chlorophenyl-Nω-diethylbiguanide, is dissolved in a mixture of 100 parts of 36% hydrochloric acid and 600 parts of water. A solution of 40 parts of sodium sulphide nonahydrate in 100 parts of water is slowly added. Copper sulphide is precipitated and is filtered off. The clear filtrate is made strongly alkaline with caustic soda. The precipitate of the crude biguanide so formed is collected, dried and crystallised from petroleum ether. It forms colourless needles which melt at 133°–134° C. uncorr.

In a similar manner, there may be obtained the following biguanides having the melting points indicated.

Ex. 2.—Nα-p-chlorophenyl- Nω - dimethylbigua - nide; colourless plates from toluene, M. P. 169° C. uncorr.

Ex. 3.—Nα - p - chlorophenyl-Nω-methyl-Nω-isopropylbiguanide; colourless needles from toluene, M. P. 174°–175° C. uncorr.

Ex. 4.—Nα-p-chlorophenyl-Nω-dibutylbiguanide; the sulphate crystallises from aqueous ethyl alcohol in colourless prisms, M. P. 180–182° C. uncorr.

Ex. 5.—Nα-p-chlorophenyl-Nω - methyl - Nω - β - methoxy - ethylbiguanide; colourless needles from methyl alcohol, M. P. 91°–93° C.

Ex. 6.—N$\alpha$-p-chlorophenyl-N$\omega$-ethyl-N$\omega$-$\beta$-diethylaminoethyl biguanide; colourless needles from petroleum ether, M. P. 78.5°–79.5° C.

Ex. 7.—N$\alpha$-p-chlorophenyl-N$\omega$:N$\omega$-tetramethylene biguanide; colourless plates from toluene, M. P. 206° C. uncorr.

Ex. 8.—N$\alpha$-p-anisyl-N$\omega$-dimethylbiguanide; colourless prisms from toluene, M. P. 142°–143° C. uncorr.

Ex. 9.—N$\alpha$-p-anisyl-N$\omega$-diethylbiguanide; colourless prisms from petroleum ether, M. P. 90°–91° C.

Ex. 10.—N$\alpha$-p-nitrophenyl - N$\omega$ - dimethylbiguanide; yellow prisms from aqueous dioxan, M.P. 167° C. uncorr.

Ex. 11.—N$\alpha$-p-nitrophenyl-N$\omega$-diethylbiguanide; yellow prisms from aqueous $\beta$-ethoxyethanol, M. P. 121°–122° C.

Ex. 12.—N$\alpha$-p-chlorophenyl-N$\omega$ - allylbiguanide; colourless prisms from toluene, M. P. 99°–101° C.

Ex. 13.—N$\alpha$-p-chlorophenyl-N$\omega$ - ethylbiguanide; colourless prisms from toluene, M. P. 99°–101° C.

Ex. 14.—N$\alpha$-p-chlorophenyl-N$\omega$ - n - amylbiguanide; colourless needles from water, M. P. 229° C.

Ex. 15.—N$\alpha$-p-chlorophenyl-N$\omega$-n-propylbiguanide; colourless crystals from ethanol, M. P. 58.5°–60° C.

Ex. 16.—N$\alpha$-p-chlorophenyl-N$\omega$-isopropylbiguanide; colourless crystals from aqueous ethanol, M. P. 130°–131° C.; the acetate forms colourless crystals from acetone, M. P. 188°–189° C.

Ex. 17.—N$\alpha$-p-chlorophenyl-N$\omega$-n-butylbiguanide acetate; colourless prisms from acetone, M. P. 158° C.

Ex. 18.—N$\alpha$-p-chlorophenyl-N$\omega$-isobutylbiguanide hydrochloride; colourless plates from acetone, M. P. 232° C.

Ex. 19.—N$\alpha$-p-chlorophenyl-N$\omega$-tert-butylbiguanide hydrochloride; colourless crystals from acetone, M. P. 232°–234° C.

Ex. 20.—N$\alpha$-p-chlorophenyl-N$\omega$-methyl - N$\omega$ - n - propylbiguanide; colourless plates from toluene, M. P. 125°–126° C.

Ex. 21.—N$\alpha$-p-chlorophenyl - N$\omega$ - methylbiguanide; colourless needles from toluene, M. P. 85°–86° C.

Ex. 22.—N$\alpha$-p-chlorophenyl-N$\omega$-(1-methyl-4-diethylamino)-butylbiguanide carbonate; formed as colourless crystalline solid by passing carbon dioxide into a solution of the free biguanide base in wet acetone; M. P. 78°–80° C. (decomp.).

Ex. 23.—N$\alpha$-p-chlorophenyl-N$\alpha$-methyl-N$\omega$ - diethylbiguanide; the hydrochloride crystallises from water in colourless prisms, M. P. 182°–184° C.

The N$\alpha$-p-chlorophenyl-N$\alpha$-methyldicyandiamide used as starting material in making this last-named biguanide is itself made by interaction of p-chlorophenyldicyandiamide with dimethyl sulphate in a methyl alcoholic solution of caustic soda. Recrystallised from toluene it forms colourless needles, of M. P. 164° C. uncorr.

*Example 24*

19.5 parts of p-chlorophenyldicyandiamide, 12.8 parts of piperidine, 66 parts of $\beta$-ethoxyethanol, and a solution of 12.5 parts of copper sulphate pentahydrate in 60 parts of water, are mixed and the mixture is stirred and heated under reflux for 4 hours. The reaction mixture is worked up in the manner described in Example 1. There is thus obtained N$\alpha$-p-chlorophenyl-N$\omega$:N$\omega$-pentamethylene biguanide which crystallises from xylene in colourless needles of M. P. 191°–192° C. uncorr.

In a similar manner, there may be obtained the following biguanides having the melting points indicated.

Ex. 25.—N$\alpha$-p-chlorophenyl-N$\omega$-cyclohexyl biguanide, M. P. 172°–173° C. uncorr.

Ex. 26.—N$\alpha$-p-chlorophenyl-N$\omega$-$\beta$-diethylaminoethyl biguanide, M. P. 126°–128° C.

Ex. 27.—N$\alpha$-p-chlorophenyl-N$\omega$-$\gamma$-diethylaminopropyl biguanide; colourless needles from petroleum ether, M. P. 81–93° C.

Ex. 28.—N$\alpha$-p-anisyl-N$\omega$:N$\omega$-pentamethylene biguanide, colourless crystals from toluene, M. P. 142°–143° C.

*Example 29*

19.5 parts of p-chlorophenyldicyandiamide 15 parts of piperidine, 200 parts of ethyl alcohol and 19 parts of copper bronze powder are mixed and the mixture is stirred and heated under reflux for 16 hours. The resultant suspension is cooled, diluted with 1250 parts of a 1.6% solution of hydrochloric acid, and filtered to remove the copper bronze. A solution of 17.5 parts of sodium sulphide nonahydrate in water is slowly added. Copper sulphide is precipitated and is filtered off. The clear filtrate is then made strongly alkaline with sodium hydroxide. Crude N$\alpha$-p-chlorophenyl-N$\omega$:N$\omega$-pentamethylene biguanide is precipitated and is filtered off, dried and crystallised from xylene, whereby colourless needles are formed, of M. P. 191°–192° C.

The product is identical with that made as described in Example 24.

*Example 30*

12.5 parts of copper sulphate pentahydrate are dissolved in water and an excess of dilute caustic soda solution is added. The precipitate of hydrated copper oxide so formed is filtered off, washed with water and mixed with 19.5 parts of p-chlorophenyl dicyandiamide, 14.4 parts of isopropylamine hydrochloride, 250 parts of ethyl alcohol and 25 parts of water, and the mixture is stirred and heated under reflux for 24 hours. The ethyl alcohol is then distilled off, and the residue is dissolved in a mixture of 500 parts of water and 65 parts of 36% hydrochloric acid. A solution of 17.5 parts of sodium sulphide nonahydrate in water is added. Copper sulphide is precipitated, and is filtered off. The clear filtrate is made strongly alkaline with caustic soda and the semi-solid precipitate so obtained is washed with water by decantation, and then dissolved in acetone. The acetone solution is dried over anhydrous potassium bicarbonate, and is made just acid by the addition of glacial acetic acid. The colourless, crystalline precipitate of N$\alpha$-p-chlorophenyl-N$\omega$-isopropyl biguanide acetate is filtered off, washed with acetone and dried. It melts at 188°–189° C.

*Example 31*

19.5 parts of p-chlorophenyldicyandiamide, 140 parts of ethyl alcohol, 8.9 parts of isopropylamine and a solution of 6.8 parts of zinc chloride in 25 parts of water are mixed and the mixture is stirred and heated under reflux for 20 hours. The ethyl alcohol is then distilled off and the residue is stirred with 250 parts of an 8% solution of caustic soda. The solid which remains undissolved is crude Nα-p-chlorophenyl-Nω-isopropyl biguanide. It is dissolved in acetone and converted to the monoacetate in the manner described in the preceding example. It then forms a colourless crystalline solid, M. P. 188°–189° C.

*Example 32*

19.5 parts of p-chlorophenyldicyandiamide and 25 parts of piperidine are refluxed together for 16 hours. The resultant solution is diluted with 500 parts of water and the suspension so formed is made acid with hydrochloric acid and filtered to remove unchanged p-chlorophenyldicyandiamide. The clear filtrate is made strongly alkaline with caustic soda and the precipitate which is formed is filtered off and recrystallised from petroleum ether. Nα-p-chlorophenyl-Nω:Nω-pentamethylene biguanide is thus obtained in the form of colourless needles, M. P. 192°–193° C.

In the claims below, the term "an amino radical" shall be understood as referring to the radical obtained by removing a hydrogen atom from the nitrogen atom of an amine as therein defined.

Whereas it will be apparent to one skilled in the art that many variations and embodiments of this invention additional to those specifically described above may be made without departing from the spirit and scope thereof, it is to be understood that the invention is not in any way limited to the embodiments illustrated, but only as defined in the following claims.

We claim:

1. A compound selected from the group consisting of the salts and free-base form of biguanides characterized by the formula

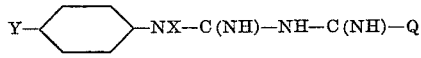

wherein Y is a member selected from the group consisting of Cl, OCH₃ and NO₂; X designates a member of the group consisting of H and CH₃, while Q stands for a radical selected from the group consisting of NH—alkyl,

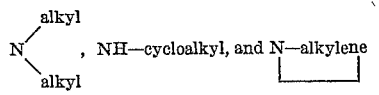

the total number of carbon atoms in the radical Q being not greater than 8.

2. Biguanides characterized by the formula

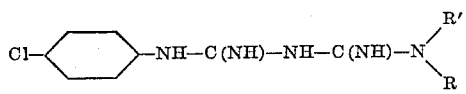

wherein R and R' represent alkyl radicals which together contain not more than 8 carbon atoms.

3. Biguanides characterized by the formula

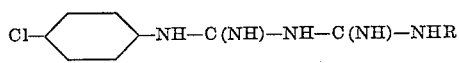

wherein R is an alkyl radical of not more than 5 carbon atoms.

4. As a new compound, Nα-p-chlorophenyl-Nω-methyl-Nω-isopropyl biguanide.

5. As a new compound, Nα-p-chlorophenyl-Nω-isopropyl biguanide.

6. As a new compound, Nα-p-chlorophenyl-Nω-n-propyl biguanide.

FRANCIS HENRY SWINDEN CURD.
FRANCIS LESLIE ROSE.

REFERENCES CITED

The following references are of record in the file of this patent:

UNITED STATES PATENTS

| Number | Name | Date |
|---|---|---|
| 1,777,738 | Scott | Oct. 7, 1930 |
| 2,149,709 | Rein | Mar. 7, 1939 |
| 2,265,944 | Langhorst | Dec. 9, 1941 |
| 2,289,541 | Ericks et al. | July 14, 1942 |
| 2,274,412 | Hill | Sept. 24, 1942 |
| 2,320,225 | Ericks | May 25, 1943 |
| 2,331,377 | D'Alelio | Oct. 12, 1943 |

FOREIGN PATENTS

| Number | Country | Date |
|---|---|---|
| 577,843 | Great Britain | June 13, 1946 |

OTHER REFERENCES

Beilstein: "Handbuch der Org. Chemie," vol. 12, pages 370–371.

Cohn: "J. Prakt. Chemie, vol. 84, (1911), pages 408–415.

Slotta et al.: "Beu. Deut. Chem. Ges.," vol. 62 (1929), pages 1400–1402.

Slotta: Ber. Deut. Chem. Ges.," vol. 63 B (1929), pages 1390–1398.